Feb. 14, 1961  T. W. GLYNN  2,971,543
WIRE MESH MACHINE
Filed March 26, 1958  6 Sheets-Sheet 1

INVENTOR.
THEODORE W. GLYNN
BY
Brown, Critchlow, Flick & Peckham
His Attorneys

Feb. 14, 1961  T. W. GLYNN  2,971,543
WIRE MESH MACHINE
Filed March 26, 1958  6 Sheets-Sheet 2
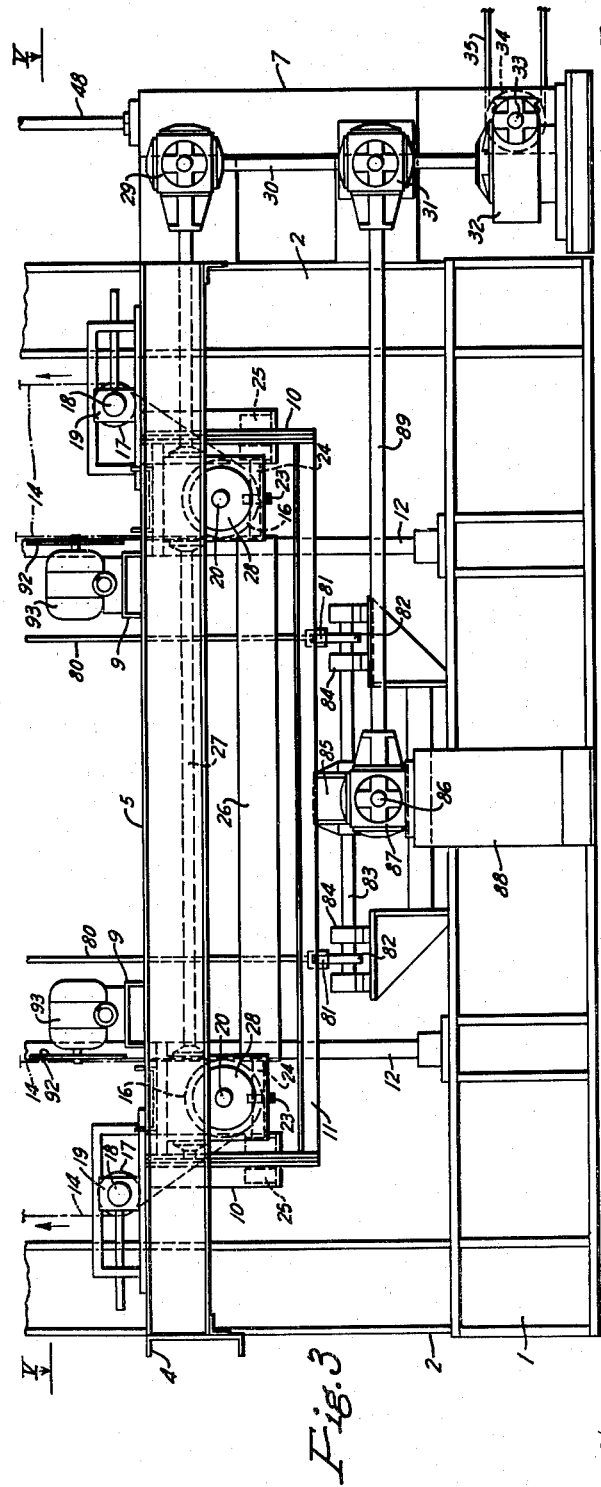
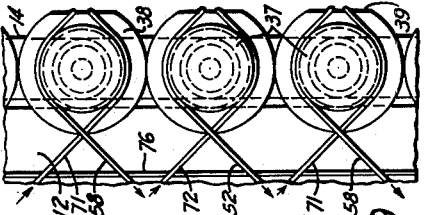
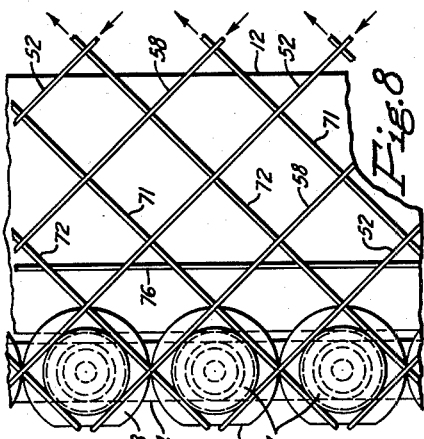
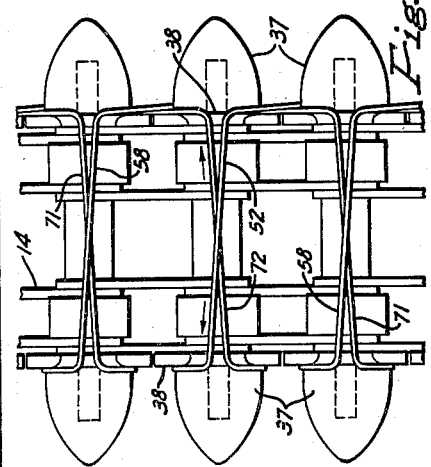
INVENTOR.
THEODORE W. GLYNN
BY
Brown, Critchlow, Flick & Peckham
His Attorneys

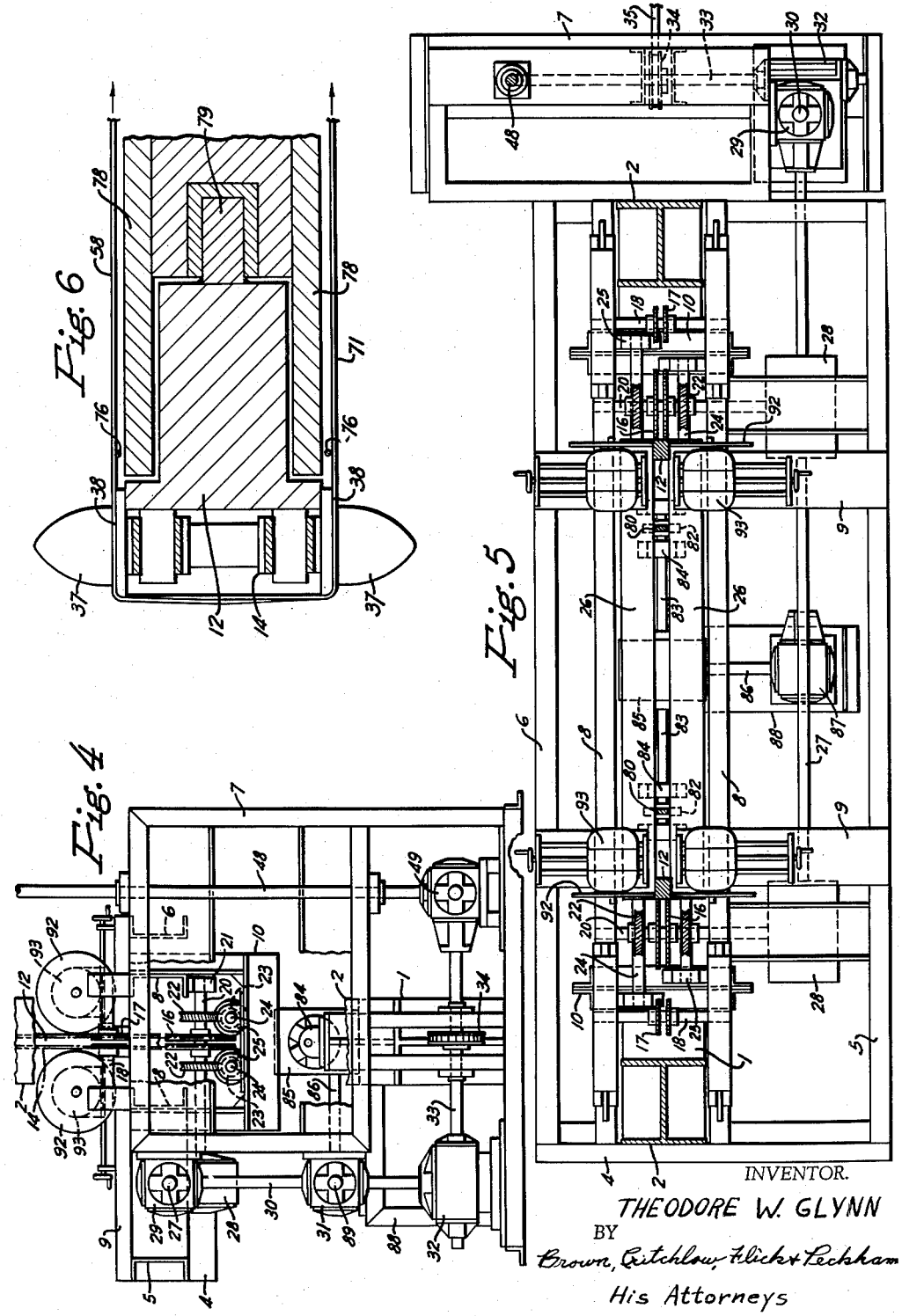

Feb. 14, 1961  T. W. GLYNN  2,971,543
WIRE MESH MACHINE
Filed March 26, 1958  6 Sheets-Sheet 4
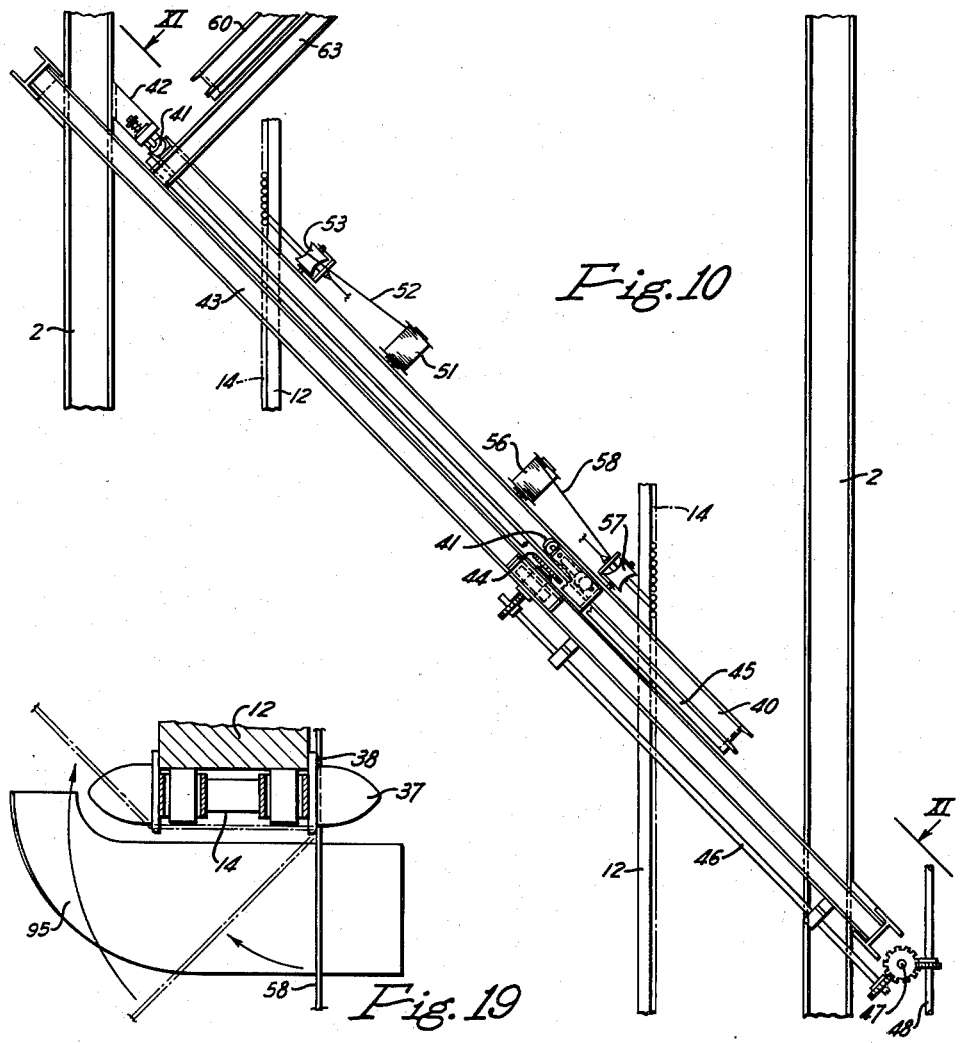
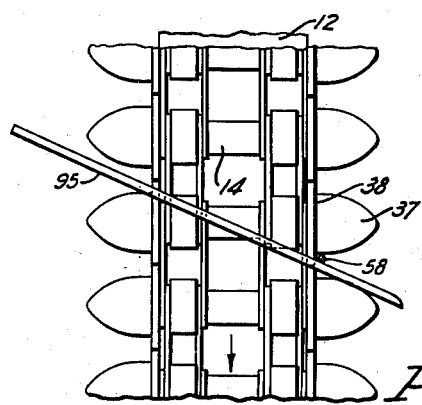
INVENTOR.
THEODORE W. GLYNN
BY
Brown, Critchlow, Flick & Peckham
His Attorneys Feb. 14, 1961     T. W. GLYNN     2,971,543
WIRE MESH MACHINE Filed March 26, 1958     6 Sheets—Sheet 5

INVENTOR.
THEODORE W. GLYNN
BY
Crown, Critchlow, Flick & Peckham
His Attorneys

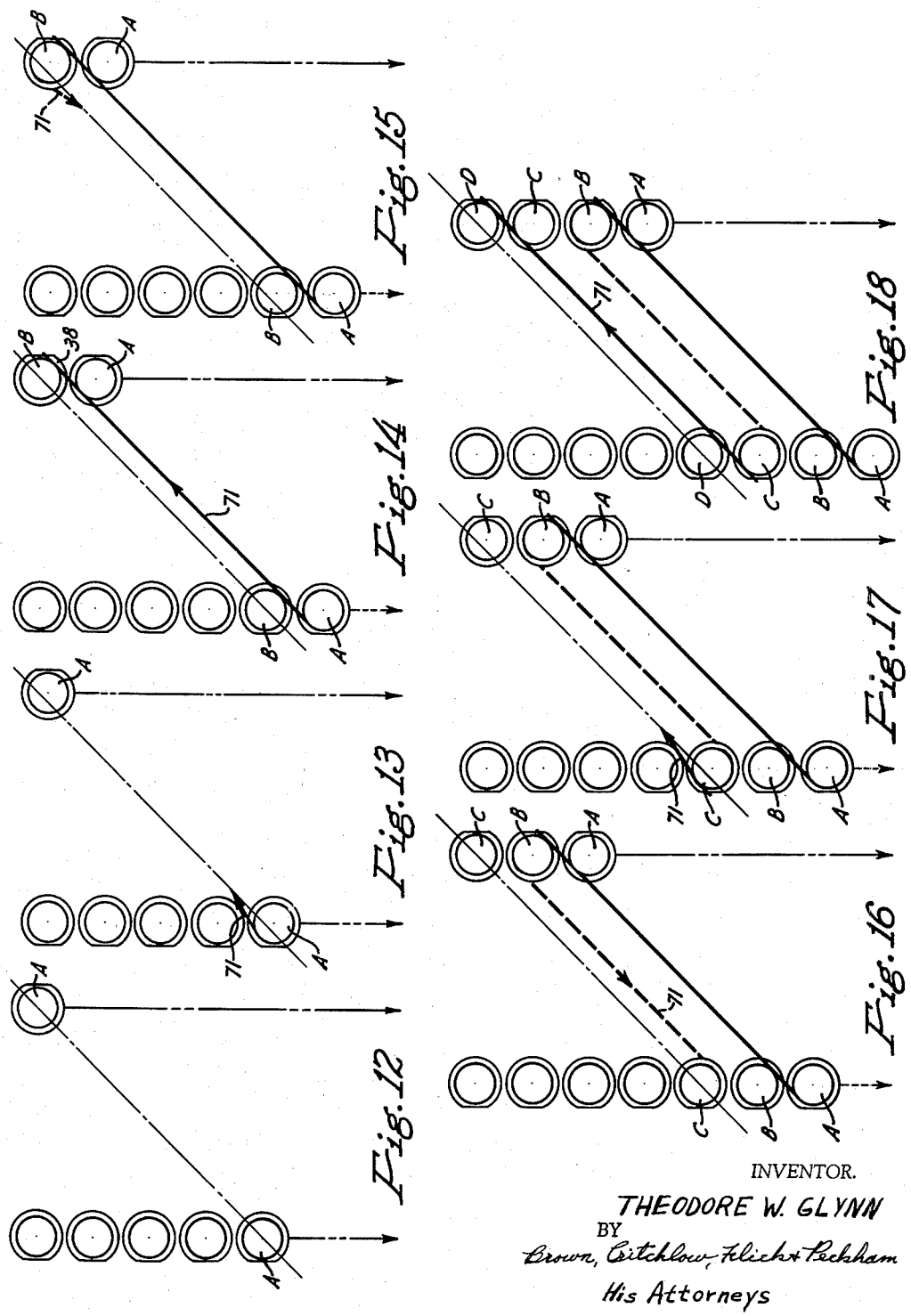

United States Patent Office 2,971,543
Patented Feb. 14, 1961

2,971,543

WIRE MESH MACHINE

Theodore W. Glynn, Kingsport, Tenn., assignor, by mesne assignments, to American-Saint Gobain Corporation, Wilmington, Del., a corporation of Delaware Filed Mar. 26, 1958, Ser. No. 724,045

11 Claims. (Cl. 140—3)

This invention relates to machines for making continuous wire mesh, and more particularly to welded mesh in which the strands are disposed diagonally.

It is among the objects of this invention a provide a machine for making wire mesh continuously, which produces two strips of mesh simultaneously, which welds the wires together as the mesh is formed and which can make mesh with square openings.

In accordance with this invention, a pair of laterally spaced endless chains have downwardly traveling parallel lengths adjacent each other, but are spaced apart slightly more than the width of the wire mesh to be made on the machine. Uniformly spaced tapered pins project from opposite sides of each chain. First wire-supplying means travel around the downwardly moving chain lengths in an inclined plane for wrapping wire tightly around them to provide inclined strands on opposite sides of the chains. Second wire-supplying means below said first means travel around the chain lengths in a plane inclined in the opposite direction to the first inclined plane for wrapping additional wire tightly around the chain lengths to provide inclined strands crossing the first-mentioned strands. This system of wrapping produces a flat tubular mesh of indefinite length. Each wire is carried under a tapered pin at one side of each chain and then over the pin opposite to it on the other side of that chain. The taper of the pins causes the portions of the wires sliding against them to be displaced vertically as the wires are pulled in toward the chains, and the inner ends of the pins are thick enough to displace the downwardly moving inclined strands of each wire into parallel relation with one another. Preferably, there are means for feeding selvage wires from above the first wire-supplying means downwardly between the chains close to the tapered pins. Means between the chains below the second wire-supplying means form a welding zone in which the parallel inclined strands of a wire at each side of the tubular mesh can be welded to the wire strands intersected thereby. There are means below the welding zone for removing from the strands the chain-engaging portions thereof to produce a separate strip of traveling wire mesh at each side of the machine.

The preferred embodiment of the invention is illustrated in the accompanying drawings, in which Fig. 1 is a front view of my machine;

Fig. 3 is an enlarged front view of the lower part of the machine;

Fig. 4 is an enlarged end view of the lower part of the machine;

Fig. 5 is an enlarged horizontal section taken on the line V—V of Fig. 3, but not showing the endless chains;

Fig. 6 is an enlarged fragmentary horizontal section through one of the chains and tracks with the wires wrapped around them, take on the line VI—VI of Fig. 1;

Fig. 7 is an enlarged fragmentary side view of the same chain carrying the wire mesh;

Fig. 8 is a fragmentary front view of the same chain;

Fig. 9 is a view similar to Fig. 8, but showing the back of the chain;

Fig. 10 is an enlarged fragmentary front view of the central portion of the machine;

Figs. 12 to 18 are diagrams illustrating the wrapping of one of the wires around the chains of the machine;

Fig. 19 is a fragmentary horizontal section of a track and chain showing a modification; and Fig. 20 is a side view of the embodiment shown in Fig. 19.

Figure 1:
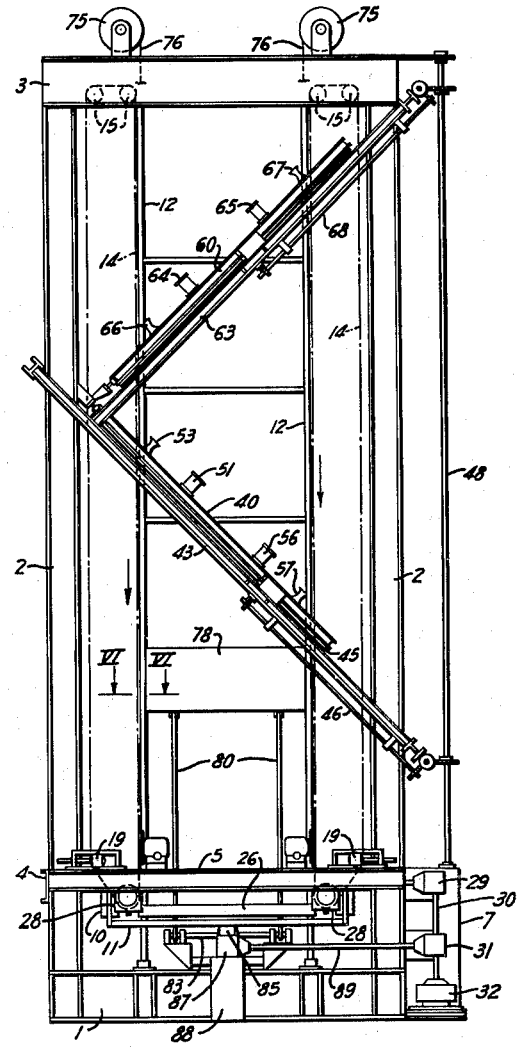

Referring to Figs. 1 to 5 of the drawings, resting on the opposite ends of a horizontal foundation beam 1 are two vertical columns 2, the upper ends of which are connected by a pair of spaced parallel channels 3. Extending across the outer side of one of the columns a short distance above the foundation beam is an end channel 4. Front and rear channels 5 and 6 are connected at one end to the ends of the end channel, and at their opposite end to the upper part of a frame 7 secured to the outer side of the adjacent column 2. Extending parallel to the front and rear channels close to the two columns are two intermediate channels 8, the opposite ends of which are secured to end channel 4 and frame 7. Mounted transversely on top of the four parallel channels are two parallel cross beams 9, which are shown a little closer to the columns than to each other. Between each of these cross beams and the nearest column a U-shaped support 10 is suspended from the intermediate channels 8. The two supports are connected by front and rear angle bars 11 secured to the lower corners of the supports. Mounted on the foundation beam are the lower ends of a pair of vertical rectangular bars 12, which extend up across the outer sides of cross beams 9 to the channels 3 on top of the two columns. The bars form tracks for endless chains. Each chain 14 is a double roller chain that has a long length extending along the adjoining rails from top to bottom of the track. The chain is supported by a pair of double sprockets 15 mounted between the top channels in the area between the track and the adjacent column. From the inner sprocket the chain extends down the track and around a double drive sprocket 16 located mostly below the level of the intermediate channels 8. It then passes up around a double idler sprocket 17 mounted on a shaft 18 journaled in adjustable bearings 19 on top of the intermediate channels, and then back up to outer double sprocket 15.

The drive sprockets 16 are rigidly mounted on horizontal shafts 20 journaled in bearings 21 on the bottom of the intermediate channels. The shafts also carry helical gears 22 that mesh with a pair of underlying helical gears 23 mounted on the opposite ends of parallel shafts 24 extending lengthwise of the channels and journaled in bearings 25 on supports 10. These shafts support a pair of horizontal guide members 26 disposed in front and in back of the two track bars 12. Preferably the guide members are rollers. The drive sprocket shafts 20 are driven from a line shaft 27 through a pair of gear reducers 28 suspended from cross beams 9. One end of the line shaft extends into an angle drive unit 29 secured to the front of frame 7. This unit is at the upper end of a vertical shaft 30 that extends down through an angle drive unit 31 and into a main gear reducer 32, which is driven by a main drive shaft 33 that extends from front to back of the frame and carries midway a sprocket wheel 34 that is driven by a toothed belt 35 from any suitable source of power.

Each chain 14 has tapered pins 37, resembling cones or acorns, projecting forward and backward from it, as shown in Figs. 6 and 7. The vertical spacing of these pins determines the distance between the wires of the mesh made on the machine. It is preferred to mount the pins on the projecting ends of the pivot pins of the chain. Therefore, for a chain having a one-inch pitch, the axes of the tapered pins will be one-inch apart. The inner end of each tapered pin is encircled by an integral collar 38 to form a narrow shoulder or ledge for receiving wires of the mesh. The outer edge of each collar is flattened as shown at 39 in Figs. 7 to 9 to prevent the mesh wires from slipping around the collars.

In order to form the mesh, wires are wrapped around the downwardly traveling chains at oblique angles to the direction of travel of the chains. This wrapping of the chain is accomplished by two rotating inclined rings disposed at a predetermined angle to each other. The lower ring 40, as shown in Figs. 1, 2, 10 and 11, is rotatably supported at three equally spaced points by sets of rollers 41 that extend between the outwardly projecting flanges of the ring. The set of rollers at the highest part of the ring is supported by a bracket 42 attached to the adjacent column 2. The other two sets of rollers are supported by an inclined rectangular framework 43 surrounding the columns directly below the ring. The ring is rotated continuously by a pinion or sprocket 44 rotatably supported by the adjacent side of the framework and meshing with a suitable ring gear 45 secured to the bottom of the ring. The roller is driven through suitable gears and an inclined shaft 46 extending from it down beneath the side of the framework to a horizontal shaft 47 supported by the lower end of the framework. This shaft is rotated by a vertical shaft 48 driven at its lower end through an angle drive unit 49 by means of the main drive shaft 33.

To wrap a wire around the moving chains, a spool 51 of wire 52 is rotatably mounted on top of the inclined ring, and a short distance ahead of it in the direction of rotation of the ring a concave guide spool 53 is journaled on the ring. The guide spool supports an adjustable friction device 54, through which wire from the supply spool extends after passing around the concave spool. When the machine is started in operation the free end of the wire is secured in any convenient manner to one of the chains and then, as will be seen in Fig. 11, while the ring is rotating in a clockwise direction the wire inside the ring will be wrapped around the two chains as it is pulled from the supply spool. The friction device resists pulling of the wire from the spool, and thereby keeps the wire taut between the ring and the chains. As it is desired to make the spacing between the inclined strands twice as narrow as it would be if only one wire were used, another pair of spools 56 and 57 are mounted on the ring at 180° from the first pair for simultaneously wrapping a second wire 58 around the chains.

The upper ring 60 (Figs. 1 and 2) wraps wires around the chains at an angle to the wires just mentioned, but of course the latter are applied over or outside of the ones wrapped by ring 60. The upper ring is mounted and driven in the same general way as the lower ring just described. That is, ring 60 is supported by a rectangular framework 63 inclined in the opposite direction from framework 43, which supports its lower end. The ring carries a pair of wire supply spools 64 and 65 and a pair of guide spools 66 and 67. It is rotated in a counter-clockwise direction, when viewed from above, by an inclined shaft 68 and a horizontal shaft 69 driven by vertical shaft 48. By rotating the rings in opposite directions, any tendency of the tracks to whip during wrapping is avoided.

Because it is desired to make square mesh with this machine, the two rings are set at 45° angles to the chains, as shown in Fig. 1, but if mesh of diamond shape were preferred, the rings could be inclined either more or less steeply, in which case the mesh patterns at front and back of the machine would be different. With the arrangement shown, it will be seen that if the chains were standing still one of the rings would wrap wires around the chains at a 45° diagonal and the other ring would wrap wires around the chains at right angles to the first wires. However, such a condition normally would not exist in actual practice because the chains are moving downward continuously. Since the left-hand chain moves downward between the time that a wire is carried around it and the time the wire reaches and is carried around the other chain, the angle of the strands between the two chains would not be 45°. At the front side of the chains the stands would be steeper than 45° angle, while at the opposite side they would be less than 45°. It is to correct this situation and to cause all of the wire strands coming from one ring to be laid at 45° angles to the downwardly traveling chain lengths that the tapered pins 37 at the front and back of the chains are used.

The moving elements of the machine are synchronized so that as each wire starts around a chain the wire will be pulled under a tapered pin at the first side of the downwardly moving chain and then over the pin axially aligned with it at the opposite side of the chain. The inclined surfaces of the pins force or displace the wires vertically relative to the axes of the pins and thereby compensate for the movement of the chains. This action is illustrated in Figs. 12 to 18, where only one wire is shown for the sake of clearness. This is a wire 71 carried by upper ring 60. The angle of the upper ring, and therefore the inclined plane in which the wire supply spools 64 and 65 travel, is shown in all of these figures in broken lines crossing the two chains. Of course, this plane always remains the same distance from the base of the machine.

In Fig. 12 the chains are shown at the instant the axes of two of their tapered pins 37 are in the plane of travel of the wire spools. A moment later, just as the axes of pins A descend below that plane as shown in Fig. 13, the wire is pulled around the left-hand chain and is forced by the inclined upper surface of lower pin A to slide up that pin toward its inner end and collar 38. When the wire is carried around the right-hand chain, as shown in Fig. 14, it is pulled between upper pins A and B and onto the ledge at the base of pin B. The thickness of the inner ends of the pins is such that the inclined strand of wire extending across the two chains is now at a 45° angle to them; that is, it is parallel to the plane of upper ring 60. The wire then is carried around the back side of the right-hand chain, which by that time has moved down far enough that the wire will engage the upper surface of rear pin B and slide up that pin toward its inner end as shown in dotted lines in Fig. 15. Then the wire is carried diagonally down across the back of the chains and under lower pin C at the back, as indicated in Fig. 16. As the chains continue to move down, the wire is carried around the left-hand chain again and slides up the inclined surface of front pin C as shown in Fig. 17, into the same relative position it was in in Fig. 13. The wire is carried up between upper pins C and D as shown in Fig. 18, and then around behind the chain again and over rear pin D and down. This cycle is repeated continuously.

It will be seen in Fig. 18 that all of the wire strands, shown in solid lines at the front of the chains and in dotted lines at the back, are parallel and at 45° angles to the chains. It also will be seen that there is an unused pin between every two used pins. The second wire 72 (Figs. 7, 8 and 9) carried by the rotating upper ring will engage and be displaced vertically by these unused pins (upper A, lower B, upper C, lower D, etc.), so that an inclined strand of the second wire will be located directly in front of each rear strand of the first wire, and a rear strand of the second wire will be located directly behind each front strand of the first wire. Of course, the two wires 71 and 72 are wrapped around the chains at the same time, one wire being only a half cycle behind the other.

The operation of the lower ring 40 is the same as the one just described, except that the two wires 52 and 58 are wrapped in the opposite direction and therefore their inclined strands cross the first set of strands at right angles as the first set moves down through the lower ring, as shown in Figs. 8 and 9. A mesh with square openings is thus formed at each side of the chains, although at this time the mesh is in the shape of a flattened tube with parallel sides.

Figure 2:
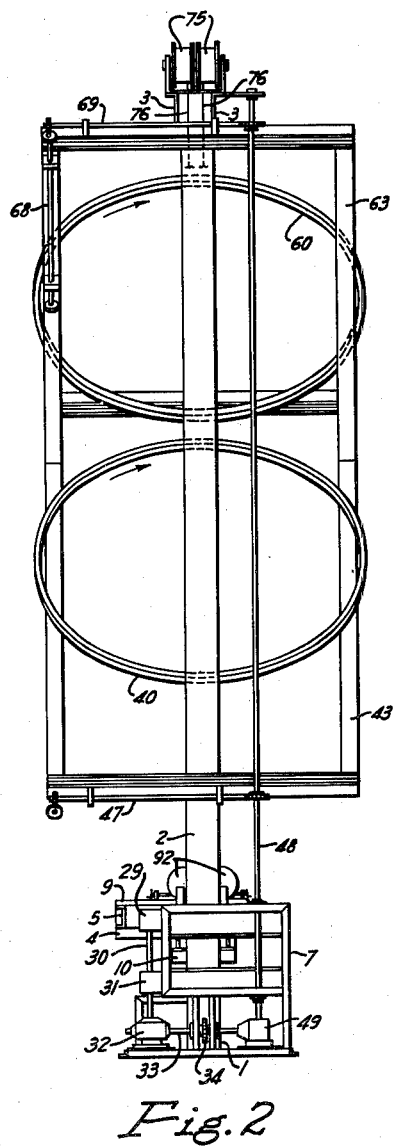
Fig. 2 is a side view.
Figure 11:
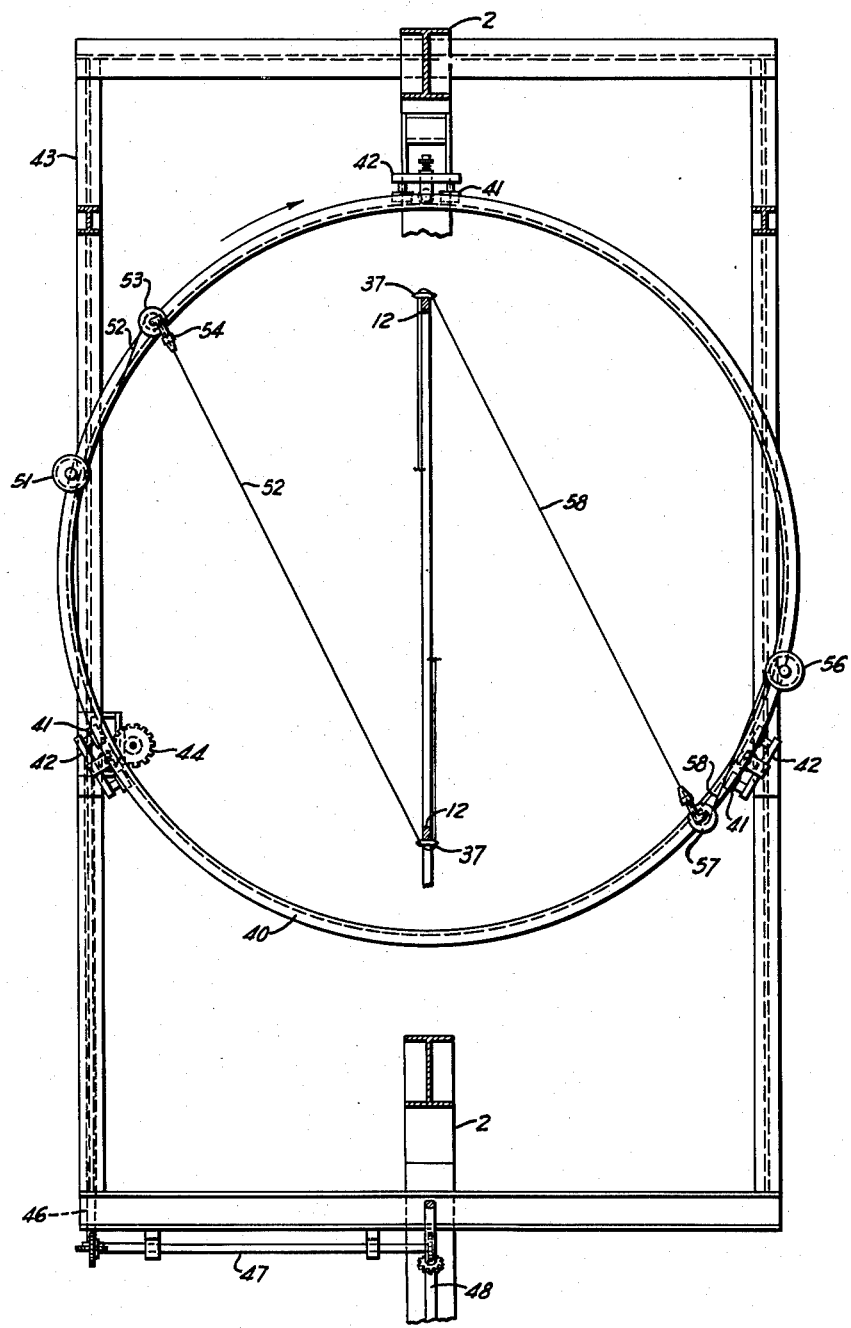
Fig. 11 is a view taken on the line XI—XI of Fig. 10.

It is desirable that the edges of the finished strips of mesh leaving the machine be provided with selvage wires. For this purpose four spools 75 of wire are journaled above the upper cross channels 3, as shown in Figs. 1 and 2, in positions that allow two selvage wires 76 to travel straight down along the front and back of each track bar close to the adjoining chain. As shown in Figs. 6, 8 and 9, the inclined strands of wire extend across the outside of the selvage wires, which are pulled downward with the mesh because they are welded to it lower down in the machine. If desired, the selvage wires could be brought into the machine between the rings 40 and 60 or below both of them in which case the selvage wires could be located between the two layers of inclined wires or outside of them.

Immediately after the mesh pattern is formed, all intersections of the various wires are welded together by suitable electric welding apparatus (not shown) that moves downward at the same speed as the mesh during each welding operation and then moves away from the mesh and upward to repeat the cycle. The welding is done against plates 78 located in a zone between the tracks below the lower ring. As shown in Fig. 6, the plates straddle the tracks and are slidable vertically on tongues 79 on the track bars by means of a pair of supporting rods 80 (Fig. 3), the lower ends of which are provided with rollers 81 that rest on cams 82 mounted on the opposite ends of a shaft 83 shown in Fig. 3. The shaft is journaled in bearings 84 mounted on foundation beam 1 between the lower ends of the track bars. This shaft extends through a gear box 85 that is driven by a shaft 86 extending forward into an angle drive unit 87 mounted on a pedestal 88. From the angle drive unit another shaft 89 extends laterally to the intermediate angle drive unit 31 that is driven by vertical drive shaft 30. The cams are shaped to move plates 78 downward at the same speed as the mesh during the moment of welding, so that there will be no relative movement between the wires and plates as the wires are pressed against them by the welding electrodes.

After the welding operation the chain-engaging portions of the four wrapping wires are removed so that two, separate, parallel, flat strips of mesh are produced. This removal preferably is accomplished by cutting the inclined strands with a pair of rotary blades 92 beside each chain, one in front and one in back. The blades are driven by motors 93 adjustably mounted on cross beams 9, and the blades are positioned to cut the mesh between the chains and adjacent selvage wires, as close to the latter as possible. The cut off portions of the mesh then are led, brushed, or blown laterally away from the chains as the remaining flat strips (the opposite sides of the split flat mesh tube) pass down between the two rollers 26 and then outwardly around them and horizontally away from each other to suitable locations where they can be cut into lengths or coiled.

With the invention disclosed herein, it will be seen that two flat strips of wire mesh of any length can be made simultaneously by continuously wrapping wires around traveling chains to form a flat, tubular mesh "belt," which, after welding of the wire intersections, is separated into two independent strips. Also, the wrapping of the wires is so controlled that all of the openings between them will have the same size and shape. The machine is especially suitable for making mesh with square openings.

In the modification shown in Figs. 19 and 20, an inclined deflector is used which may be a plate 95. This plate is held rigidly in position across the outside of the chain, and is positioned to guide the wire 58, for example, from beneath a pin 37 at the front of the chain to the top of a pin at the back of the chain. The deflector plate is intended primarily for a case where the pins may not be tapered or, as shown, where it is desired to have the wire pass over the rear pin that is above the one in alignment with the front pin engaging the wire. The reason that the plate does not appear to be inclined steeply enough for that purpose is that by the time the wire has been carried up the plate to the back of the chain, the chain will have moved down far enough to bring the pin in question down to the proper level.

Although the machine has been illustrated and described as having downwardly traveling wire-receiving chain lengths, which is preferred, it will be understood that the invention would not be departed from if the chains were in some other position, such as horizontal for example.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A machine for making wire mesh continuously, comprising a pair of laterally spaced endless chains having downwardly traveling parallel lengths adjacent each other, means for advancing said chains continuously, uniformly spaced pins projecting from opposite sides of each chain, first wire-supplying means, means for continuously moving said wire-supplying means around said downwardly moving chain lengths in an inclined plane for wrapping wire tightly around them to provide inclined strands on opposite sides of the chains, second wire-supplying means below said first means, means for continuously moving said second wire-supplying means around said chain lengths in a plane inclined in the opposite direction to said first inclined plane for wrapping additional wire tightly around said chain lengths to provide inclined strands crossing the first-mentioned strands, whereby a downwardly moving flat tubular mesh is formed, means for directing each wire under a pin at one side of each chain and then over a pin on the other side of that chain, and the wire-engaging surfaces of the two pins at their inner ends being positioned to displace the downwardly moving inclined strands of each wire into parallel relation with one another, there being between the chains below said second wire-supplying means a welding means where the parallel inclined strands of a wire at each side of the chains can be welded to the wire strands intersected thereby, and means below said welding means for severing from said strands the chain-engaging portions thereof to produce a separate strip of traveling wire mesh at each side of the machine.

2. A machine as recited in claim 1, in which each of said wire-supplying means is formed for carrying two wires around the chains 180° apart.

3. A machine as recited in claim 1, in which said last-mentioned means are rotating cutters projecting between the chains and disposed close to them.

4. A machine as recited in claim 1, including below said last-mentioned means guide members extending across the chains at both sides thereof and adapted to have said mesh strips pass down between them and then outward in opposite directions away from the machine.

5. A machine as recited in claim 1, in which a welding plate is located in the plane of the chains, and the machine includes reciprocating means for periodically moving the plate downward at the same speed as the chains.

6. A machine as recited in claim 5, including parallel tracks between the chains engaged by said lengths, the opposite ends of said plate being slidably mounted on said tracks for movement lengthwise thereof.

7. A machine as recited in claim 1, in which said planes are inclined at 45° to said chain lengths to produce square mesh.

8. A machine as recited in claim 1, in which said directing means are inclined members extending across the chains.

9. A machine for making wire mesh continuously, comprising a pair of laterally spaced endless chains having downwardly traveling parallel lengths adjacent each other, means for advancing said chains continuously, uniformly spaced tapered pins projecting from opposite sides of each chain, first wire-supplying means, means for continuously moving said wire-supplying means around said downwardly moving chain lengths in an inclined plane for wrapping wire tightly around them to provide inclined strands on opposite sides of the chains, second wire-supplying means below said first means, means for continuously moving said second wire-supplying means around said chain lengths in a plane inclined in the opposite direction to said first inclined plane for wrapping additional wire tightly around said chain lengths to provide inclined strands crossing the first-mentioned strands, whereby a downwardly moving flat tubular mesh is formed, each wire being carried under a tapered pin at one side of each chain and then over a pin on the other side of that chain, the taper of the pins causing the portions of the wires sliding against them to be displaced vertically as the wires are pulled in toward the chains, and the inner ends of the pins being thick enough to displace the downwardly moving inclined strands of each wire into parallel relation with one another, there being between the chains below said second wire-supplying means a welding means where the parallel inclined strands of a wire at each side of the chains can be welded to the wire strands intersected thereby, and means below said welding means for severing from said strands the chain-engaging portions thereof to produce a separate strip of traveling wire mesh at each side of the machine.

10. A machine as recited in claim 8, in which each wire-supplying means includes a ring rotatable continuously around said chain lengths, means on the ring for rotatably supporting a spool of wire, and friction means carried by the ring for resisting unreeling of wire from the spool, whereby to hold the wire taut as it is wrapped around the chains.

11. A machine for making wire mesh continuously, comprising a pair of laterally spaced endless chains having downwardly traveling parallel lengths adjacent each other, means for advancing said chains continuously, uniformly spaced tapered pins projecting from opposite sides of each chain, first wire-supplying means, means for continuously moving said wire-supplying means around said downwardly moving chain lengths in an inclined plane for wrapping wire tightly around them to provide inclined strands on opposite sides of the chains, second wire-supplying means below said first means, means for continuously moving said second wire-supplying means around said chain lengths in a plane inclined in the opposite direction to said first inclined plane for wrapping additional wire tightly around said chain lengths to provide inclined strands crossing the first-mentioned strands, whereby a downwardly moving flat tubular mesh is formed, each wire being carried under a tapered pin at one side of each chain and then over a pin on the other side of that chain, the taper of the pins causing the portions of the wires sliding against them to be displaced vertically as the wires are pulled in toward the chains, and the inner ends of the pins being thick enough to displace the downwardly moving inclined strands of each wire into parallel relation with one another, means for feeding selvage wires downwardly between the chains close to said pins, there being between the chains below said second wire-supplying means a welding means where the parallel inclined strands of a wire at each side of the chains can be welded to the wire strands and selvage wires intersected thereby, and means below said welding means for severing said inclined strands between the chains and adjacent selvage wires to produce a separate strip of traveling wire mesh at each side of the machine.

References Cited in the file of this patent

UNITED STATES PATENTS

| | | |
|---|---|---|
| 1,945,890 | Gaskell | Feb. 6, 1934 |
| 2,000,788 | Reed | May 7, 1935 |
| 2,137,257 | White | Nov. 22, 1938 |
| 2,160,715 | Blaisdell | May 30, 1939 |
| 2,455,346 | Wickwire | Nov. 30, 1948 |
| 2,487,392 | Southwick | Nov. 8, 1949 |
| 2,772,701 | Brune | Dec. 4, 1956 |